United States Patent [19]

Watson

[11] Patent Number: 4,735,552

[45] Date of Patent: * Apr. 5, 1988

[54] SPACE FRAME WIND TURBINE

[76] Inventor: William K. Watson, 5409 Denver Ave. South, Seattle, Wash. 98108

[*] Notice: The portion of the term of this patent subsequent to Jan. 1, 2002 has been disclaimed.

[21] Appl. No.: 784,789

[22] Filed: Oct. 4, 1985

[51] Int. Cl.4 ............................................. F03D 11/04
[52] U.S. Cl. ...................................... 416/99; 416/142; 416/196 A
[58] Field of Search ........ 416/99, 41 A, 142, DIG. 6, 416/171, 225, 196 A, 194 A, 195, 240 A, 189 A, 122 A, 132 B; 290/44, 55

[56] References Cited

U.S. PATENT DOCUMENTS

| | | | |
|---|---|---|---|
| 677,747 | 7/1901 | Sterzing | 416/196 A X |
| 1,361,019 | 12/1920 | Cook | 416/196 A X |
| 1,419,962 | 6/1922 | Denham | 416/99 |
| 4,197,056 | 4/1980 | Hütter | 416/142 B X |
| 4,213,737 | 7/1980 | Gerhardt | 416/142 B X |
| 4,229,661 | 10/1980 | Mead et al. | 290/55 X |
| 4,366,387 | 12/1982 | Carter et al. | 416/132 B |
| 4,450,364 | 5/1984 | Benoit | 416/99 X |
| 4,482,110 | 11/1984 | Crimmins | 416/86 X |
| 4,491,739 | 1/1985 | Watson | 416/196 A X |
| 4,533,297 | 8/1985 | Bassett | 416/132 B |

FOREIGN PATENT DOCUMENTS

| | | | |
|---|---|---|---|
| 163921 | 9/1949 | Austria | 416/99 |
| EP15131 | 9/1980 | European Pat. Off. | 416/121 A |
| 735210 | 5/1943 | Fed. Rep. of Germany | 416/142 B |
| 3322589 | 1/1985 | Fed. Rep. of Germany | 416/43 A |
| 688774 | 8/1930 | France | 416/194 A |
| 1048392 | 12/1953 | France | 416/DIG. 6 |
| 2288877 | 5/1976 | France | 416/132 B |
| 2464384 | 4/1981 | France | 416/99 |
| WO84/00053 | 1/1984 | PCT Int'l Appl. | |
| 211766 | 2/1924 | United Kingdom | 416/171 |
| 703577 | 2/1954 | United Kingdom | 416/DIG. 6 |
| 2067247 | 7/1981 | United Kingdom | 416/41 A |

Primary Examiner—Everette A. Powell, Jr.
Attorney, Agent, or Firm—Seed and Berry

[57] ABSTRACT

A new design for large wind turbines permitting a substantial reduction in weight and cost. Lightweight airfoils comprising the turbine blades are supported within an extensive space frame system which eliminates the large bending moments to which the blades of a conventional wind turbine are subject. The turbine's useful power output is produced by lightweight electrical generators mounted inside nacelles located at the wind turbine's rotational perimeter. The nacelle-mounted generators are driven by separate, pivotable, high RPM retropellers whose high RPM is made possible by the resultant high airstream velocity encountered at the turbine perimeter.

4 Claims, 4 Drawing Sheets

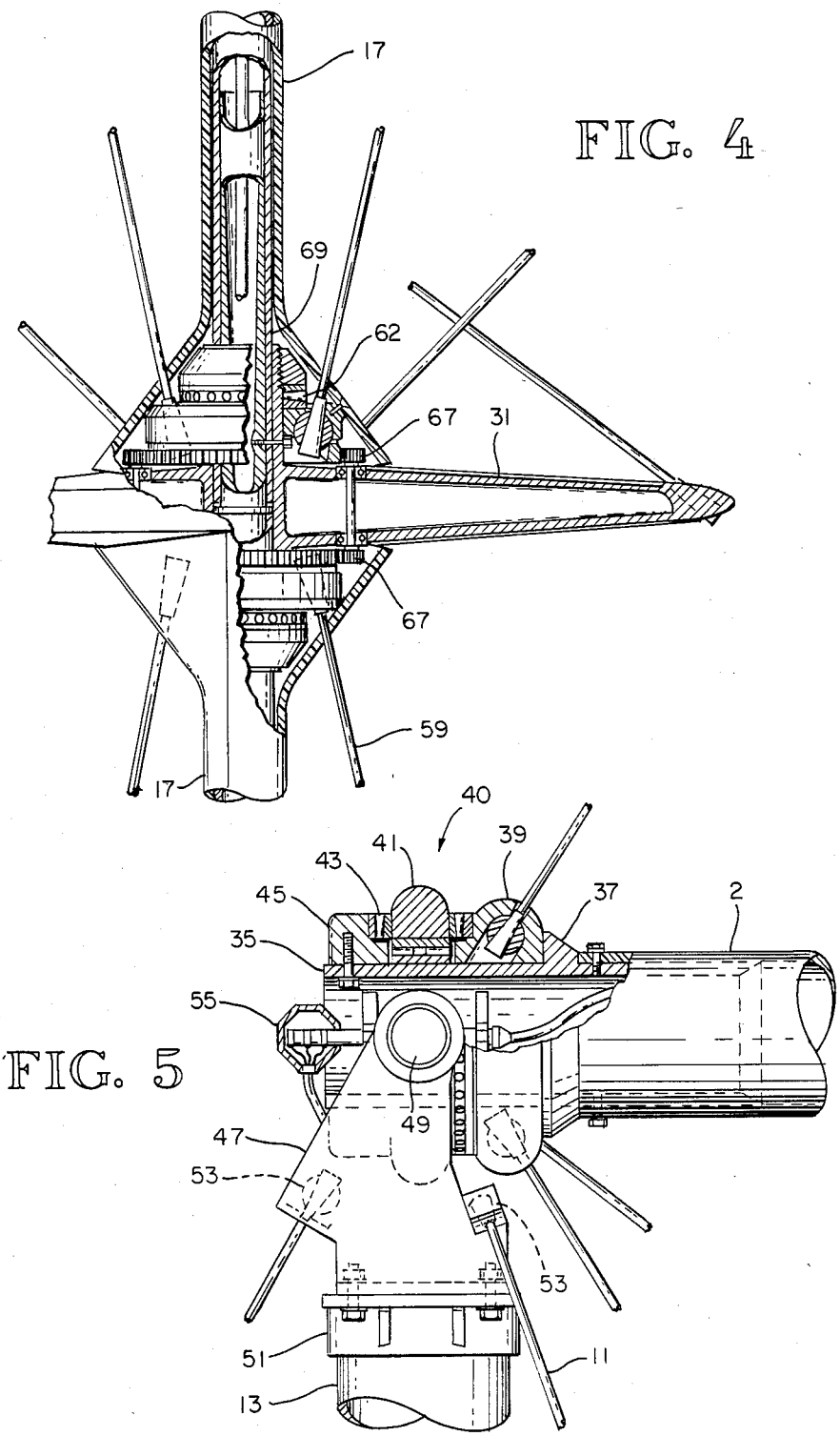

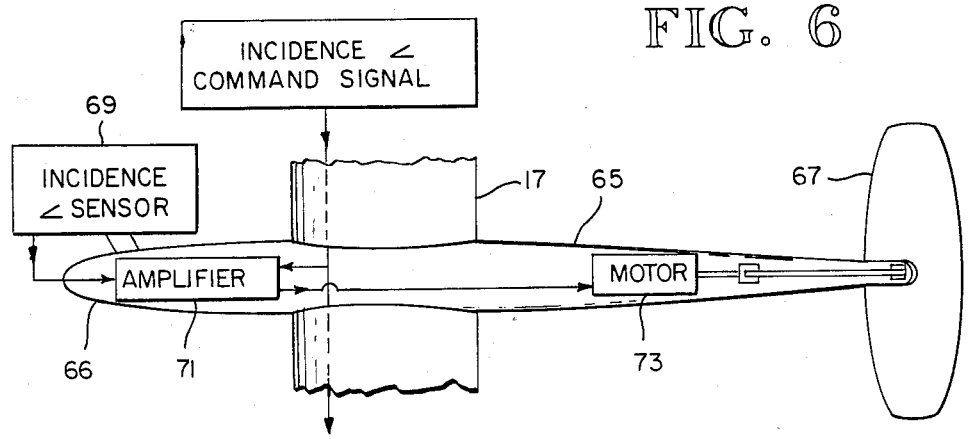
FIG. 6
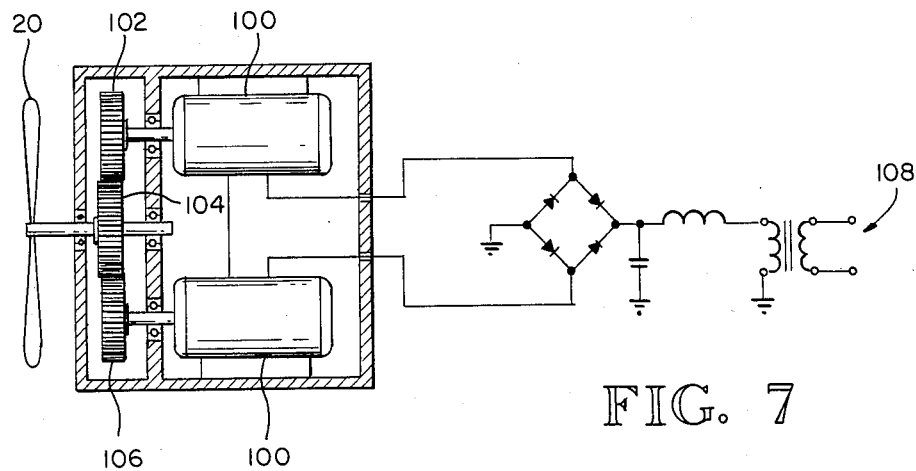
FIG. 7
FIG. 8
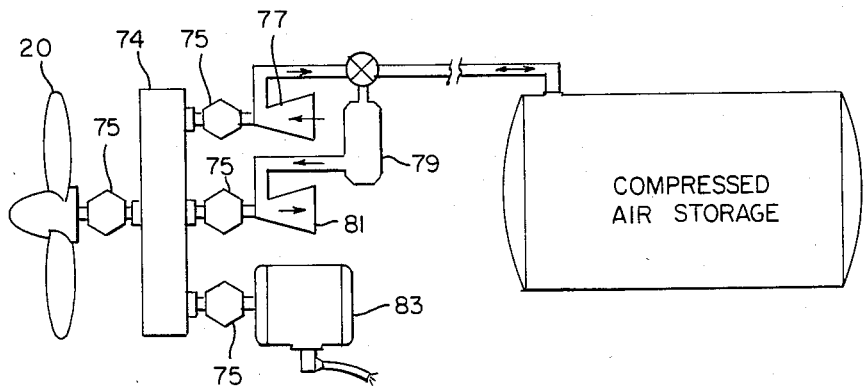

SPACE FRAME WIND TURBINE

TECHNICAL FIELD

This invention relates to wind turbines, and specifically to a novel design for a tower-mounted, horizontal axis wind turbine.

BACKGROUND ART

Conventional horizontal axis wind turbines employ two or three blades cantilevered out from a central axle. This axle in turn drives a generator through a step-up gearbox. Typically, the large blades of the turbine are substantially rigid, requiring sufficient strength to support the blades from the axle of the turbine. As the turbine is scaled up for large power generation, the blades become prohibitively heavy and costly. Because the blades are now very large, the turbine must be limited to relatively slow rotational speeds. Thus, either a large, high-torque, low-speed generator or a small, low-torque, high-speed generator with a large step-up gearbox must be employed to efficiently remove energy from the turbine. Both alternatives result in heavy, expensive equipment being mounted on the top of a tower with the turbine blades. The present invention describes an alternative design for a large wind turbine which will reduce the cost and weight of the power generating components, and therefore the overall cost of a large wind turbine.

DISCLOSURE OF INVENTION

It is an object of the present invention to reduce the weight of power generating components in a large-scale, ground based wind turbine.

It is a further object of the invention to utilize inexpensive, low-torque, high-speed generators with a large-scale ground based wind turbine.

It is yet another object of the invention to provide for storage of excess power generated by the wind turbine and to provide for supplemental power generation when power demand exceeds the output of the wind turbine.

The invention achieves these objects by utilizing large, lightweight airfoil sections supported under compression by a cable stayed space frame. The space frame and airfoils are driven by the wind around a common axis. Lightweight, high-speed generators, driven by retropellers, are mounted at the periphery of the space frame structure at the ends of the airfoil sections. The generators are driven at a high speed due to the large tangential velocity of the periphery of the rotating space frame, thereby eliminating the need for heavy step-up gears. Furthermore, since the rotational energy of the turbine is extracted at the periphery of the space frame instead of the axis of rotation, the use of large, low-speed, high-torque generators is avoided. Thus, the invention utilizes the least expensive and lightest components for extracting wind energy.

The space frame is supported between two towers, at least one of which can be rotated in azimuth to permit alignment of the space frame wind turbine with the wind's current direction. The space frame is designed to be driven into rotation about a horizontal axis by the light-weight sections of airfoil, which are supported by the space frame in such a manner that they will not experience the large bending moments which the cantilevered blades of a conventional wind turbine must be built to withstand.

As the airfoil sections cause the space frame to rotate, they also force into rotation the retropellers mounted on power nacelles located at the space frame's rotational perimeter. At this location, the retropellers experience a vector sum velocity of the wind's velocity and the much higher rotational velocity of the space frame perimeter. This high vector sum velocity, plus division of the task between several retropellers, allow retropellers of relatively small diameter and high RPM to absorb the power produced by the interaction of the space frame airfoil system with the wind.

The high RPM of the perimeter retropellers, compared with the RPM at which the space frame is rotating, proportionately reduces the gearbox weight needed to drive, within the nacelles, lightweight electrical generators such as have been developed for the aerospace industry. The lightweight generators produce the space frame wind turbine's useful power output.

BRIEF DESCRIPTION OF THE DRAWINGS

FIG. 4 is an enlarged, partially sectional view, taken generally along the line 4—4 of FIG. 3, of the midpoint guy assembly.

FIG. 5 is a partially sectional view of a tower top assembly for supporting either end of the space frame.

FIG. 6 is a schematic representation of the aircraft control components which are used to control airfoil angle of incidence.

FIG. 7 is a partially schematic, partially cross-sectional view of a lightweight generator system suitable for use in the perimeter nacelles.

FIG. 8 is a schematic representation of a compressed air storage and a combustion turbine system for the perimeter nacelle generating system, for more dependable power output.

BEST MODE FOR CARRYING OUT THE INVENTION

Figure 1:
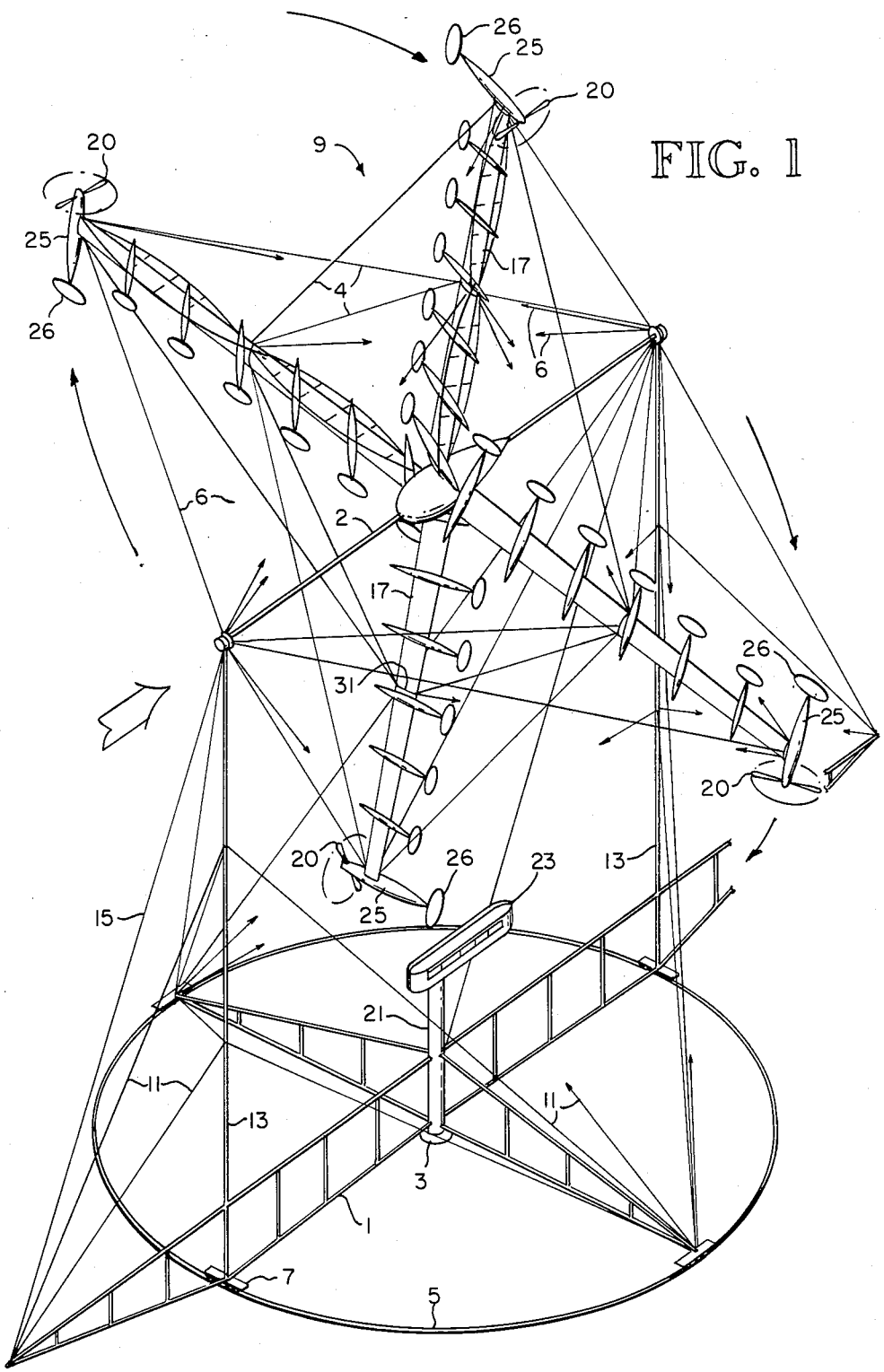
FIG. 1 is an isometric view of the preferred embodiment of this invention, showing two towers rotatable about a central axle, a space frame rotatably suspended between the two towers, and power nacelles located at the space frame's rotational perimeter.

As shown in FIG. 1, wheels rolling on a circular track 5 allow crossarm carriage 1 to rotate about a central axle 3. The crossarm carriage 1 in turn supports the two towers 13 to allow rotation of the towers in azimuth while they support a space frame 9 in operating position.

FIG. 1 also shows the airfoil sections 17 mounted within the space frame 9, which is free to rotate about a horizontal axis extending between the two towers 13.

Power nacelles 25 are mounted at the space frame's rotational perimeter as far out as possible from the space frame's axis of rotation so that retropellers 20 mounted on the nacelles 25 are driven by the highest possible air velocity. The nacelles are free to rotate in relation to the airfoil sections 17 so that the retropellers 20 can be directed into the resultant airflow. Nacelle fins 26 direct the retropellers into the resultant airflow.

UNDERSTRUCTURE

In the present invention, weight aloft has been minimized by placing a relatively wide, heavy, and rigid carriage 1 just above ground level. A lightweight space frame wind turbine construction 9 mounted above this carriage provides the structural rigidity aloft needed to extract the wind's energy.

In FIG. 1, the crossarm carriage 1, which supports the wind turbine 9 is rotatable about a central axle 3. Powered, wheeled cars 7 rolling on the circular track 5, permit the wind turbine to turn into the wind. The central axle 3 is mounted vertically in the ground and withstands the maximum horizontal force exerted by the wind turbine. Thus the wheeled cars 7 are not subjected to substantial side forces.

Two turbine support towers 13 are mounted on the longer crossarm of carriage 1. The towers are spaced apart to accommodate the axial length of space frame 9. Guy cables 11 extend from the outer ends of the crossarms of carriage 1 to support the towers 13. Two counterforce cables 15 extend from the tops of towers 13 to the longer crossarm of carriage 1. These two cables act as guy cables to help support the towers 13 but are also strong enough to resist the downwind force which will be exerted by airfoil sections 17 in recovering power from the wind.

Figure 2:
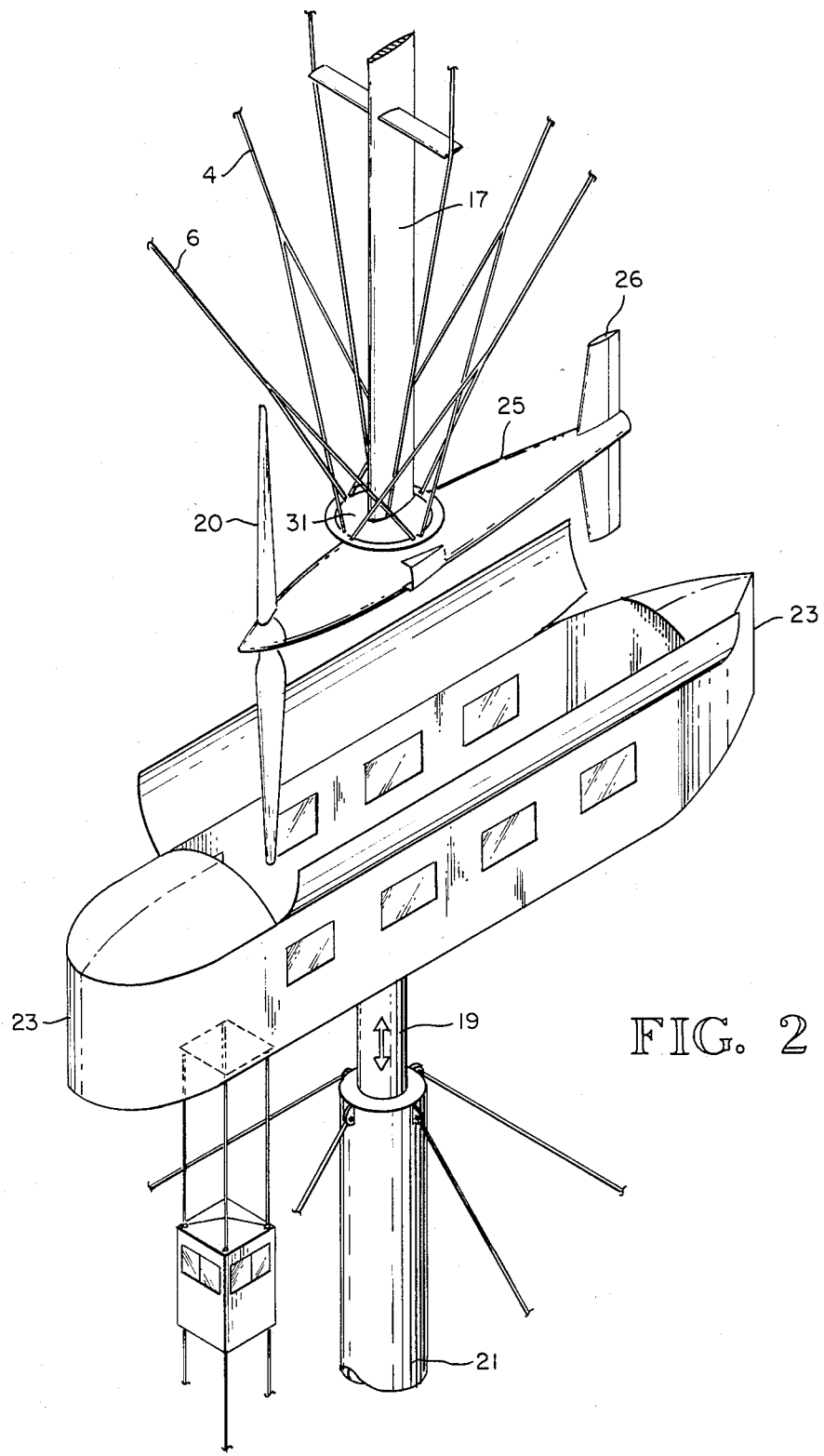
FIG. 2 is an isometric view showing a vertically movable cab to permit maintenance of a perimeter power nacelle.

FIG. 2 illustrates a hydraulic cylinder 19 enclosed at the top of a repair tower 21 for raising a cab 23. The raised cab permits maintenance and repair work on a perimeter power nacelle 25. FIG. 2 shows the attachment of space frame cables 4 and 6 to the guy disk 31. The bifurcated attachment of each cable permits any one cable to fail without subjecting the disk to a large bending moment.

FIG. 5 illustrates one possible design for the two tower top assemblies, which rotatably support opposite ends of the space frame's axial spar 2. A sleeve 35 slides into the tubular end of the axial spar to a depth limited by sleeve shoulder 37. Onto this sleeve there slides in succession a cable end retention ring 39, a trunnion ring 41, plus the bearings 43 needed to keep this ring from rotating with the sleeve 35, and a locking ring 45.

The gimbal yoke 47 supports the trunnion ring by means of the trunnions 49 and bolts to the top of the tower end adapter 51, which slips down over the tubular end of the tower top. The topmost end of tower guy cables 11 terminate at the yoke's ball socket end fittings 53. A slip ring assembly 55 transfers electricity from the rotating sleeve system to the tower top for transmission down to ground level.

AIRFOIL SECTIONS AND SUPPORTING SPACE FRAME

Figure 3:
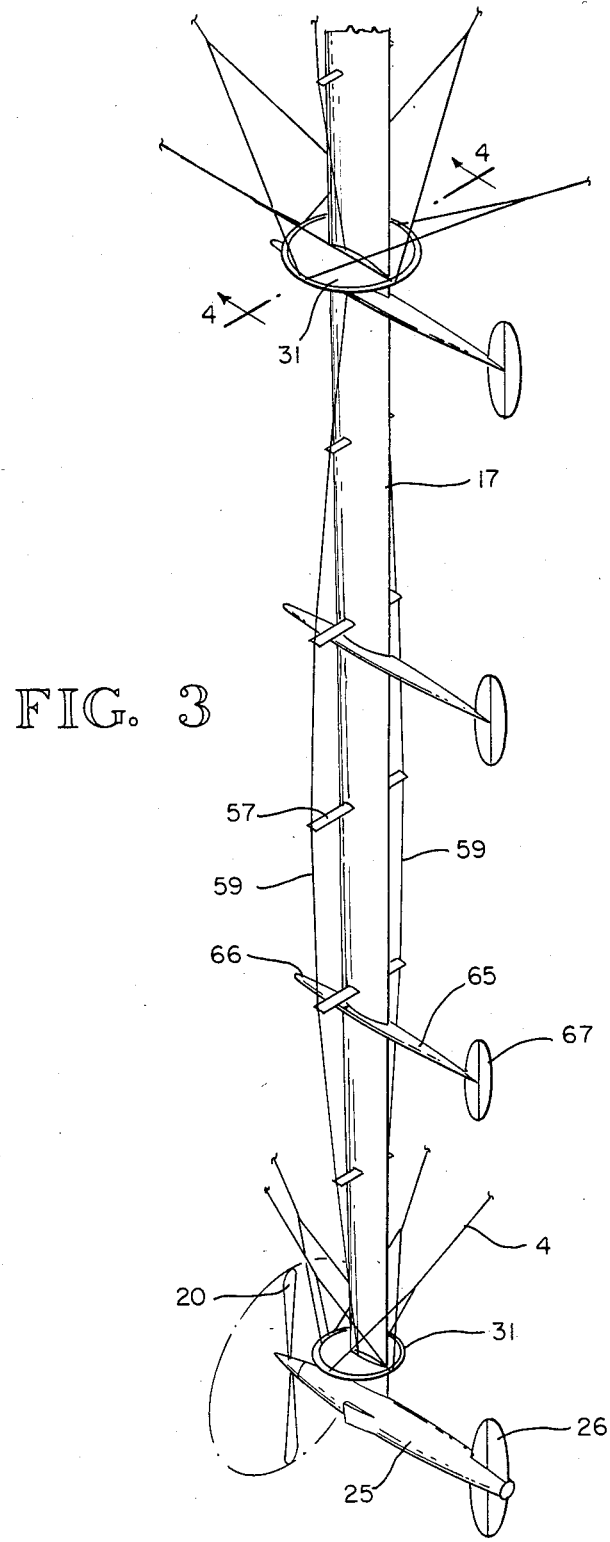
FIG. 3 is an isometric view, enlarged from FIG. 1, showing in more detail a section of airfoil integrated into the space frame structure.

In FIG. 3, airfoil lift force is transferred at intervals to the transverse struts 57 and from them to the airfoil truss cables 59, which extend in polygonal arcs above and below, and from end to end of each airfoil section 17. A tubular spar 61 (FIG. 4) runs longitudinally through the interior of each airfoil section and provides the longitudinal compression member needed to complete a cable-stayed truss system for each airfoil section. The depth of the truss system thus formed is much greater than the thickness of the airfoil—many feet vs. many inches—and will experience a correspondingly reduced stress load in response to the lift force the airfoil creates.

The saucer-shaped midpoint guy assembly 31, shown in FIGS. 3 and 4, distributes the stress load produced by airfoil lift between the truss systems, reducing the level of stress each will experience. In FIG. 4, the gears 67 and connecting axle allow the torque booms to twist (on bearings 62) the airfoil on either side of the guy assembly as if the two airfoil section ends were physically joined.

The internal truss spar 61 extends through both airfoil sections to a perimeter nacelle 25 at it outer end and to the axial spar 2 (FIG. 1) at its inner end. Several spars 61 extend radially outward from the axial spar 2 to the perimeter nacelles. Lateral space frame cables 4 run between the saucer-shaped guy assemblies 31 (see FIG. 3) to hold the radial spars 61 in fixed position with respect to each other, while their position with respect to axial spar 2 is maintained by longitudinal space frame cables 6, which run from the guy assemblies out to the end of the axial spar. This completes the space frame for supporting the airfoil sections. Thus the airfoil sections do not support themselves as beams cantilevered out from a central axle, as in a conventional wind turbine.

The preferred method of controlling airfoil angle of incidence to airflow is shown in FIGS. 3 and 6. In FIG. 3, fins 67 mounted on torque booms 65 are distributed at intervals along each airfoil section. Each airfoil section 17 is designed to be longitudinally stiff but torsionally soft enough that the airfoil can be twisted by fins 67 to an optimum angle of incidence to airflow along its entire length, or allowed to relax to feather into the wind, thus reducing the chance of storm damage.

Rotation of the fins is controlled by the assembly of standard aircraft control components shown in FIG. 6. An airflow angle of incidence sensor 69 is mounted on or near each torque boom 65. The sensor's output is compared in an amplifier 71 with a command signal designating the desired angle of incidence. The amplifier in turn actuates a motor 73 which rotates the fin 67 in a direction which will twist the local area of the airfoil to a local angle of incidence to airflow more nearly approaching that mandated by the command signal. The command signal can be generated by means well known to those skilled in the art.

The forward extensions 66 of the torque booms 65 (FIG. 3) provide lever arms for placement of weight to produce rotational equilibrium of the airfoil sections 17 about the internal truss spar 61 (FIG. 6).

PERIMETER GENERATING SYSTEM

In FIG. 1, the perimeter retropellers 20 experience both the wind's velocity and the turbine's rotational velocity at the perimeter. The resulting high vector sum air velocity enables retropellers of comparatively small diameter and high RPM to absorb the power created by the interaction of the turbine airfoils 17 with the wind. This high RPM proportionally reduces the weight of the gearboxes needed to drive lightweight electrical generators inside the power nacelles.

A conventional utility system power generator weighs about 10 lbs/KW and is far too heavy for use in the space frame's perimeter nacelles 25. The generator system shown in FIG. 7 uses lightweight, high-frequency generators 100 driven through differential gears 102, 104, 106 to produce a low-frequency output at 108 suitable for power line use, as described in U.S. Pat. No. 4,491,739 and in more detail in patent application U.S. Ser. No. 688,682, filed Jan. 3, 1985, the disclosure of which is incorporated herein by reference. Other means for adapting the output of lightweight, high-frequency generators to power line use, such as cycloconverters and motor generator sets, can be substituted.

An alternative source of power for driving the wind turbine's electrical generators is shown in FIG. 8. A combustion turbine typically combines a compressor, a combustion chamber (combustor), and a turbine, and can weigh as little as 0.5 lb/KW of delivered power. This light weight makes feasible the addition of a combustion turbine to the generator drive system in the space frame's perimeter nacelles 25 to supplement the power available from the wind.

Modifications to the combustion turbine allow its components to be used independently. Gearbox 74 and selective engagement of the clutches 75 allow various uses for these components. When sufficient wind power is available, the retropeller 20 alone drives the generator system 83. When wind power available exceeds current demand, the retropeller 20 drives the compressor 77 to compress air for storage. The compressed storage air, with optional addition of fuel in combustor 79, can later be used in the turbine 81 to drive the generators 83. The combustion turbine components can all be operated together as a normal combustion turbine, with the compressor 77 compressing air for immediate combustion with fuel, then immediate expansion through the turbine 81, to provide peaking power as needed.

The fuel for the combustion turbine can be stored at ground level and pumped, as needed, up through the central axle 3 (FIG. 1), from there out the longer carriage arm and up a tower 13, and from there through the space frame spars 2 and 61, on out to the power nacelles 25. Rotary joints in the fuel line allow the fuel to be moved past such obstacles as the tower top assemblies, which support and allow rotation of the space frame.

While the above description contains many specificities, these should not be considered as limitations on the scope of the invention but rather as examples of the preferred embodiment. Many other variations are possible. For example, flotation pontoons could be attached to the bottom of crossarm carriage 1, shown in FIG. 1, to permit floating the space frame wind turbine on bodies of water.

While the radial spars 61 in FIG. 4 are described as being fixed to the space frame structure, and the airfoils as being rotatably mounted on these spars, in an alternative arrangement the radial spars 61 could be rigidly attached to the airfoils and then rotatably mounted to the rest of the space frame. In this case, the radial spars would also have to be made torsionally soft enough to twist with the airfoil to operate in the manner described.

Other arrangements are possible for supporting the space frame in operating position; thus, in FIG. 1, one of the two towers 13 could be placed at the central axle 3 and the second tower swiveled about this central fixed tower to keep the system headed into the wind, but this arrangement would require a substantially increased radius for the circular track 5 and might require more than one track.

The retropellers at the turbine perimeter could be used exclusively for driving air compressors. The air thus compressed could be sent through the interior of the radial spars 61 to the axial spar 2, through this spar to one of the towers 13, down this tower to the undercarriage 1, transferred to the central axle 3, and from there piped to a ground level electrical generator or stored for later use. This arrangement would allow the use of conventional generators, located at ground level, to produce the space frame wind turbine's electrical power output.

Accordingly, the scope of this invention should not be limited to the embodiments listed but by the appended claims and their legal equivalents, interpreted as broadly as possible in view of the pertinent prior art.

I claim:

1. A wind turbine structure comprising:
   a space frame supported at a sufficient height above ground to permit rotation of the space frame about a substantially horizontal rotational axis, the space frame having an axial compression member having two ends and which itself is incapable of supporting substantial bending moments, at least three radially extending compression members defining a radial plane and disposed at angles to each other, first tensional members located in the radial plane and interconnecting the radially extending compression members, second tensional members interconnecting the radially extending compression member with the ends of the axially extending compression member to substantially rigidly hold the radially extending compression members at angles wherein weight of the compression members above the rotation axis is supported as tension in the second tensional members and transferred to compression in the axial compression member;
   means for structurally supporting the space frame from the earth's surface;
   airfoil means on the radially extending compression members for causing the wind to rotate the space frame about the horizontal axis;
   a rotatable retropeller for driving a generator; and
   means for mounting the rotatable retropeller and for mounting a power train driven by said retropeller, wherein said mounting means is located on the space frame at radius substantially away from the rotation axis of said space frame, so that the retropeller may be rotated by the vector sum of the wind's velocity and the velocity of rotation of the space frame at the radium of said mounting means.

2. The wind turbine structure of claim 1 wherein said space frame structural support means comprises:
   two support towers positioned to support the space frame at either end of the space frame's axis of rotation, the two towers being of sufficient height to permit continuous rotation of the space frame about the horizontal rotation axis; and
   a movable undercarriage on which at least one of said two towers is mounted, wherein said undercarriage permits rotation of the space frame in azimuth to align with the wind's direction.

3. The wind turbine structure of claim 1 wherein said space frame includes:
   an axial spar rotatably supported at its ends by the structural support means;
   substantially radial spars extending outwardly from said axial spar;
   airfoils enclosing said radial spars, wherein each airfoil enclosing a radial spar is divided into at least two sections;
   third tensional members extending above and below, and from end to end of each airfoil section; and
   struts disposed transversely between the airfoil and said third tensional members positioned above and below the airfoil, whereby the radial spar, the transverse struts, and the third tensional members running from end to end of each airfoil section form a truss system to which airfoil lift force is transferred 4. The wind turbine structure of claim 1 wherein the airfoil means comprises:

airfoil sections which are longitudinally stiff and torsionally soft so that the airfoil sections can twist to an optimum angle of incidence to airflow for producing power or relax to feather into the wind; and torque booms mounted at intervals along each airfoil and a fin rotatably mounted on each boom so that the angle of the fin to the boom may be adjusted to create a moment which is transferred through the boom to the airfoil section to twist the airfoil to a desired angle of incidence to local airflow.

* * * * *